United States Patent
German et al.

(10) Patent No.: US 12,160,693 B2
(45) Date of Patent: *Dec. 3, 2024

(54) INTERNET OF THINGS (IOT) SYSTEM FOR CABLING INFRASTRUCTURE

(71) Applicant: CommScope Technologies LLC, Hickory, NC (US)

(72) Inventors: Michael Gregory German, Secaucus, NJ (US); LeaAnn Harrison Carl, Plano, TX (US); Ryan E. Enge, Carrollton, TX (US); Matthew R. Kiener, Richardson, TX (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,558

(22) Filed: Dec. 16, 2022

(65) Prior Publication Data

US 2023/0124584 A1    Apr. 20, 2023

Related U.S. Application Data

(63) Continuation of application No. 17/015,328, filed on Sep. 9, 2020, now Pat. No. 11,558,680.

(Continued)

(51) Int. Cl.
*H04Q 1/02* (2006.01)
*G16Y 10/75* (2020.01)
(Continued)

(52) U.S. Cl.
CPC ............ *H04Q 1/136* (2013.01); *G16Y 10/75* (2020.01); *G16Y 40/10* (2020.01); *H04Q 9/02* (2013.01);
(Continued)

(58) Field of Classification Search
CPC ........... H04Q 2209/00; H04Q 2209/10; H04Q 2209/40; H04Q 2209/43; H04Q 2209/70;
(Continued)

(56) References Cited

U.S. PATENT DOCUMENTS

| 5,394,503 A | 2/1995 | Dietz, Jr. et al. |
| 5,406,260 A | 4/1995 | Cummings et al. |

(Continued)

FOREIGN PATENT DOCUMENTS

| CN | 102726056 A | 10/2012 | |
| EP | 1796402 A1 * | 6/2007 | ........... H01R 13/447 |

(Continued)

OTHER PUBLICATIONS

European Patent Office, "Communication under Rule 71(3) EPC", from EP Application No. 19161100.3, from Foreign Counterpart to U.S. Appl. No. 16/293,536, dated Jul. 14, 2020, pp. 1 through 44, Published: EP.

(Continued)

*Primary Examiner* — Franklin D Balseca
(74) *Attorney, Agent, or Firm* — Fogg & Powers LLC (57) ABSTRACT

A system for cabling infrastructure that includes at least one port, at least one shutter, at least one sensor and a gateway is provided. The port is configured to be selectively coupled to a connector. Each shutter is configured to have an open state that allows access to an associated port and a closed state that covers the port. Each sensor is configured to sense the open state and the closed state of an associated shutter and generate shutter state signals that include information relating to a current sensed state of the associated shutter and an identification of a port that is associated with the associated shutter. The gateway is in wireless communication with each sensor to receive the shutter state signals. The gateway is configured to communicate the shutter state (Continued)

signals that indicate a change in a state of an associated shutter to a remote location.

26 Claims, 6 Drawing Sheets

Related U.S. Application Data (60) Provisional application No. 62/899,256, filed on Sep. 12, 2019.

(51) Int. Cl.
*G16Y 40/10* (2020.01)
*H04Q 9/02* (2006.01)

(52) U.S. Cl.
CPC ..... *H04Q 2209/10* (2013.01); *H04Q 2209/40* (2013.01); *H04Q 2209/75* (2013.01); *H04Q 2209/88* (2013.01)

(58) Field of Classification Search
CPC .. H04Q 2209/75; H04Q 2209/88; H04Q 9/00; H04Q 9/02; H04Q 1/136; G16Y 10/75; G16Y 40/10
See application file for complete search history.

(56) References Cited

U.S. PATENT DOCUMENTS

| | | | |
|---|---|---|---|
| 5,483,467 A | 1/1996 | Krupka et al. | |
| 5,550,755 A | 8/1996 | Martin et al. | |
| 5,764,043 A | 6/1998 | Czosnowski et al. | |
| 5,821,510 A | 10/1998 | Cohen et al. | |
| 5,854,824 A | 12/1998 | Bengal et al. | |
| 6,002,331 A | 12/1999 | Laor | |
| 6,222,908 B1 | 4/2001 | Bartolutti et al. | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,424,710 B1 | 7/2002 | Bartolutti et al. | |
| 6,522,737 B1 | 2/2003 | Bartolutti et al. | |
| 6,532,215 B1 | 3/2003 | Muntz | |
| 6,705,707 B2 | 3/2004 | Furukawa | |
| 6,725,177 B2 | 4/2004 | David et al. | |
| 6,784,802 B1 | 8/2004 | Stanescu | |
| 6,961,675 B2 | 11/2005 | David | |
| 6,968,994 B1 | 11/2005 | Ashwood Smith | |
| 6,985,713 B2 | 1/2006 | Lehr et al. | |
| 7,034,660 B2 | 4/2006 | Watters et al. | |
| 7,106,071 B2 | 9/2006 | Pham et al. | |
| 7,139,668 B2 | 11/2006 | Bechhoefer | |
| 7,153,142 B2 | 12/2006 | Shifris et al. | |
| 7,160,143 B2 | 1/2007 | David et al. | |
| 7,164,274 B2 | 1/2007 | Pham et al. | |
| 7,170,393 B2 | 1/2007 | Martin | |
| 7,193,422 B2 | 3/2007 | Velleca et al. | |
| 7,217,152 B1 | 5/2007 | Xin et al. | |
| 7,289,449 B1 | 10/2007 | Rubinstein et al. | |
| 7,297,018 B2 | 11/2007 | Caveney et al. | |
| 7,370,106 B2 | 5/2008 | Caveney | |
| 7,414,410 B2 | 8/2008 | Pharn et al. | |
| 7,517,243 B2 | 4/2009 | Caveney et al. | |
| 7,573,254 B2 | 8/2009 | Cobb et al. | |
| 7,664,232 B2 | 2/2010 | Sherman | |
| 7,705,606 B2 | 4/2010 | Peyton et al. | |
| 7,719,992 B1 | 5/2010 | Gourlay et al. | |
| 7,737,704 B2 | 6/2010 | Diab et al. | |
| 7,738,387 B2 | 6/2010 | Diab et al. | |
| 7,769,090 B2 | 8/2010 | Peleg et al. | |
| 8,618,927 B2* | 12/2013 | Wohlert | H04M 11/04 340/531 |
| 8,638,651 B2 | 1/2014 | Michaelis et al. | |
| 8,643,476 B2 | 2/2014 | Pinn et al. | |
| 8,670,335 B2 | 3/2014 | Barkan et al. | |
| 8,913,746 B2 | 12/2014 | Ware et al. | |
| 8,954,763 B2 | 2/2015 | German et al. | |
| 9,201,162 B2 | 12/2015 | Hardegger et al. | |
| 9,538,262 B2* | 1/2017 | German | G06F 13/4282 |
| 9,565,659 B1 | 2/2017 | Bertz | |
| 9,678,133 B2 | 6/2017 | Enge | |
| 9,742,704 B2 | 8/2017 | Coffey | |
| 9,759,884 B2 | 9/2017 | Coffey et al. | |
| 10,410,484 B2* | 9/2019 | Dial, IV | G08B 3/10 |
| 10,938,167 B2 | 3/2021 | German et al. | |
| 11,174,721 B2* | 11/2021 | Brookes | H04Q 9/02 |
| 11,450,993 B2 | 9/2022 | German et al. | |
| 11,558,680 B2* | 1/2023 | German | H04Q 9/00 |
| 2002/0090858 A1 | 7/2002 | Caveney | |
| 2004/0021452 A1 | 2/2004 | Hwang et al. | |
| 2005/0245127 A1 | 11/2005 | Nordin et al. | |
| 2006/0160396 A1 | 7/2006 | Macauley et al. | |
| 2006/0164998 A1 | 7/2006 | Pham | |
| 2007/0117444 A1 | 5/2007 | Caveney et al. | |
| 2007/0243725 A1 | 10/2007 | Nordin et al. | |
| 2008/0122579 A1 | 5/2008 | German et al. | |
| 2008/0265915 A1 | 10/2008 | Clark et al. | |
| 2008/0286987 A1 | 11/2008 | Timmins et al. | |
| 2009/0096581 A1 | 4/2009 | Macauley et al. | |
| 2009/0175195 A1 | 7/2009 | Macauley | |
| 2009/0178119 A1 | 7/2009 | Macauley | |
| 2010/0008482 A1 | 1/2010 | Tucker | |
| 2010/0011097 A1 | 1/2010 | Cobb | |
| 2010/0085156 A1 | 4/2010 | Tucker | |
| 2010/0244998 A1 | 9/2010 | Peyton et al. | |
| 2011/0043371 A1 | 2/2011 | German et al. | |
| 2011/0097925 A1 | 4/2011 | Caveney et al. | |
| 2011/0195598 A1 | 8/2011 | Panella et al. | |
| 2012/0128136 A1 | 5/2012 | German et al. | |
| 2014/0209254 A1 | 7/2014 | Birru et al. | |
| 2015/0073613 A1 | 3/2015 | Li et al. | |
| 2015/0308863 A1* | 10/2015 | Chen | G01D 5/34 385/12 |
| 2015/0334473 A1 | 11/2015 | Pinn et al. | |
| 2015/0372431 A1 | 12/2015 | Hirano et al. | |
| 2017/0033559 A1 | 2/2017 | Chien | |
| 2017/0070090 A1 | 3/2017 | Miller | |
| 2018/0026404 A1 | 1/2018 | Geo | |
| 2019/0041637 A1 | 2/2019 | German et al. | |
| 2019/0174650 A1 | 6/2019 | Smith | |
| 2019/0228622 A1 | 7/2019 | Dial, IV et al. | |
| 2020/0067239 A1* | 2/2020 | Southworth | H01R 13/6683 |
| 2021/0084390 A1 | 3/2021 | German et al. | |

FOREIGN PATENT DOCUMENTS

| | | |
|---|---|---|
| JP | 2015198308 A | 11/2015 |
| WO | 2019006026 A1 | 1/2019 |
| WO | 2020117449 A1 | 6/2020 |

OTHER PUBLICATIONS

European Patent Office, "Extended European Search Report", from EP Application No. 19161100.3, from Foreign Counterpart to U.S. Appl. No. 16/293,536, dated Jun. 25, 2019, pp. 1 through 8, Published: EP.

European Patent Office, "Extended European Search Report", from EP Application No. 20201421.3, from Foreign Counterpart to U.S. Appl. No. 16/293,536, dated Feb. 3, 2021, pp. 1 through 7, Published: EP.

Gabara, "Phantom Mode Signaling in VLSI Systems", 2001, pp. 88-100, IS22-869X/01, BNSDOCID: <XP_10538448A_I_>, (c) 2001 IEEE.

International Bureau, "International Preliminary Report on Patentability", from PCT Application No. PCT/US2020/049834, from Foreign Counterpart to U.S. Appl. No. 17/015,328, dated Mar. 24, 2022, pp. 1 through 8, Published: WO.

International Searching Authority, "International Search Report and Written Opinion", from PCT Application No. PCT/US2020/049834, from Foreign Counterpart to U.S. Appl. No. 17/015,328, dated Jan. 20, 2021, pp. 1 through 12, Published: WO.

(56) References Cited

OTHER PUBLICATIONS

U.S. Patent and Trademark Office, "Final Office Action", U.S. Appl. No. 17/015,328, dated May 27, 2022, pp. 1 through 24, Published: US.

U.S. Patent and Trademark Office, "Notice of Allowance", U.S. Appl. No. 16/293,536, dated Nov. 12, 2020, pp. 1 through 11, Published: US.

U.S. Patent and Trademark Office, "Notice of Allowance", U.S. Appl. No. 17/015,328, dated Sep. 19, 2022, pp. 1 through 8, Published: US.

U.S. Patent and Trademark Office, "Notice of Allowance", U.S. Appl. No. 17/161,166, dated May 16, 2022, pp. 1 through 13, Published: US.

U.S. Patent and Trademark Office, "Office Action", U.S. Appl. No. 16/293,536, dated Jul. 15, 2020, pp. 1 through 26, Published: US.

U.S. Patent and Trademark Office, "Office Action", U.S. Appl. No. 17/015,328, dated Dec. 27, 2021, pp. 1 through 41, Published: US.

U.S. Patent and Trademark Office, "Office Action", U.S. Appl. No. 17/161,166, dated Jan. 24, 2022, pp. 1 through 34, Published: US.

European Patent Office, "Extended European Search Report", from EP Application No. 20862310, from Foreign Counterpart to U.S. Appl. No. 17/015,328, dated Jul. 11, 2023, pp. 1 through 7, Published: EP.

China National Intellectual Property Administration, "Notification of the First Office Action", from CN Application No. 202080063766.8, dated Jul. 6, 2023, from Foreign Counterpart to U.S. Appl. No. 17/015,328, pp. 1 through 24, Published: CN.

China National Intellectual Property Administration, "Notification of the Second Office Action", dated Feb. 7, 2024 from CN Application No. 202080063766.8, from Foreign Counterpart to U.S. Appl. No. 17/015,328, Page(s) 1 through 23, Published: CN.

China National Intellectual Property Administration, "Rejection Decision", dated May 18, 2024 from CN Application No. 20208063766.8, from Foreign Counterpart to U.S. Appl. No. 17/015,328, Pages(s) 1 through 21, Published: CN.

\* cited by examiner

INTERNET OF THINGS (IOT) SYSTEM FOR CABLING INFRASTRUCTURE

CROSS-REFERENCE TO RELATED APPLICATIONS

This application claims priority to U.S. Non-Provisional application Ser. No. 17/015,328, same title herewith, filed on Sep. 9, 2020, which claims priority to U.S. Provisional Application Ser. No. 62/899,256, same title herewith, filed on Sep. 12, 2019, which are incorporated in their entirety herein by reference.

BACKGROUND

Telecommunications and cable companies use patching systems in strategic locations to easily connect and disconnect services without having to go into the actual locations. A patching system may be used in connection with data center environments, providing interconnection between servers, switches, storage devices, and other data center equipment, as well as home and office/LAN environments. In a telecommunication system, a patching system is typically used to interconnect the various telecommunication lines. A patching system may include a mounting frame that has one or more racks. A typical location of the patching system is within a telecommunications closet, server room, or data center.

A rack typically includes a plurality of patch panels. Further each patch panel typically includes a plurality of communication ports. Each communication port is connected to a fixed communication line. These fixed connections can be made using punch-down blocks (in the case of copper communication media) and fiber adapters, fiber splice points, and fiber termination points (in the case of fiber communication media). Accordingly, each fixed communication line is terminated at a select communication port on a patch panel in an organized manner. In small patch systems, all communication lines may terminate on the patch panels of the same rack. In larger patch systems, multiple racks may be used, wherein different communication lines terminate on different racks.

Each port is also configured to attach a second cable typically referred to as a patch cable or patch cord. Each port includes a suitable female connector, adapter, or jack that mates with the corresponding male connector on the end of the patch cord. The connection between the patch cord connector and the port connector is designed to facilitate the easy and repeated attachment and un-attachment of the patch cord to the port. Examples of cables include CAT-5, 6, and 7 twisted-pair cables having modular connectors or plugs attached to both ends (in which case, the patch cords 402 include compatible modular jacks) or fiber cables having SC, LC, FC, LX.5, MTP, or MPO connectors (in which case, the patch cords 402 include compatible SC, LC, FC, LX.5, MTP, or MPO connectors or adapters). Other types of connectors including, for example, BNC connectors, F connectors, DSX jacks and plugs, bantam jacks and plugs, and MPO and MTP multi-fiber connectors and adapters may also be used.

Interconnections between the various communication lines are made using patch cords. Both ends of each patch cord are typically terminated with patch cord connectors. In use, one end of a patch cord is selectively connected to a first select port associated with a first communication line and the opposite end of the patch cord is selectively connected to second port that is associated with a second communications line. By selectively connecting the various lines with patch cords, any combination of communication lines can be interconnected.

The tracking of the connections configuration of the system is traditionally a manual process. A technician, who made the connection or disconnection with one or more ports at the patch panel, informs a technician at a management system at in remote network of the connection or disconnection with a port. The technician at the management system at the remote network then manually configures the system to accommodate the change. Configurations may include initial setup to create a database to track connections.

SUMMARY

The following summary is made by way of example and not by way of limitation. It is merely provided to aid the reader in understanding some of the aspects of the subject matter described. Embodiments provide an IoT system for cable infrastructure that uses state of shutter information that communicated through the internet via gateway to a management system at a remote location that automatically updates and configures the cable infrastructure based at least in part on the state of shutter information.

In one embodiment, a system for cabling infrastructure is provided. The system includes at least one port, at least one shutter, at least one sensor and a gateway. The at least one port is configured to be selectively coupled to a connector. The at least one shutter is configured to have an open state that allows access to an associated port of the at least one port and a closed state that covers the associated port. Each sensor is configured to sense the open state and the closed state of an associated shutter of the at least one shutter and generate shutter state signals that include information relating to at least a current sensed state of the associated shutter and an identification (ID) of a port that is associated with the associated shutter. The gateway is in wireless communication with each sensor to receive the shutter state signals. The gateway is configured to communicate the shutter state signals that indicate a change in a state of an associated shutter to a remote location.

In another example embodiment, another system for cabling infrastructure is provided. The system includes at least one port, a shutter for each port, a sensor of each shutter, a power source for each sensor, a gateway and a management system. The at least one port is configured to be selectively coupled to a connector of a patch panel. Each shutter is configured to have an open state which allows access to an associated port of the shutter and a closed state that covers the associated port. The sensor for each shutter is configured to sense the state of the shutter. The sensor is configured to wirelessly transmit shutter state signals that include information relating to at least a current sensed state of the shutter and an identification (ID) of the shutters associated port. The power source for each sensor is used to at least power the transmission of the shutter state signals. The gateway is in wireless communication with each sensor to receive the shutter state signals from each sensor. The gateway is configured to communicate information indicating a change in state of an associated shutter to a remote location. The management system is in a remote network in the remote location and is configured to update and configure a system automatically based on received information sent by the gateway.

In yet another embodiment, a method of configuring a cabling infrastructure is provided. The method includes monitoring the current state of a shutter with a sensor, wherein the state of the shutter is one of an open state which allows access to an associated port and a closed state that covers the associated port; wirelessly communicating a shutter state signal to a gateway, the shutter state signal including information relating to at least a current sensed state of the shutter by the sensor and an identification (ID) of the associated port; communicating information in shutter state signals that indicate a change of a state of the shutter to a system in a remote location; and automatically configuring the system based on the communicated information from the gateway.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments use shutter sensors to generate shutter state signals that indicate a state of the shutter and an identification of a port of the associated shutter. The shutter state signals are wirelessly communicated to a gateway. The gateway communicates shutter state information to a remote location using the internet of things (IoT) system. A management system in the remote location automatically configures a new connection for use based at least in part on new shutter states information received via the IoT. An IoT system allows internet connectivity for physical devices beyond traditional devices such as desktops, laptop, tablets and smart phones. IoT systems allows for the physical devices (the things) to gather and share data from their environment with other devices and networks. To accomplish communication, the device must have a unique identifiable presence on the internet that is accomplished through its own internet protocol (IP) address.

Figure 1A:
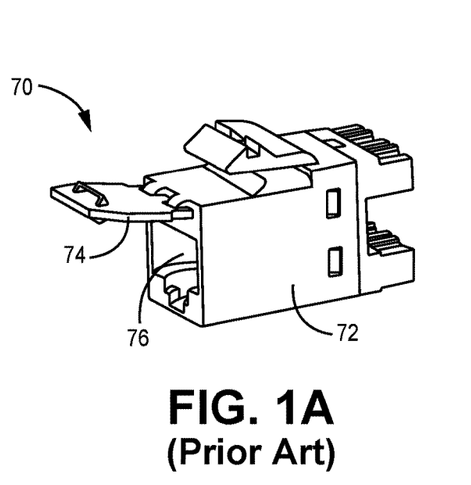
FIG. 1A illustrates an example of a module with a shutter of the prior art.
Figure 1B:
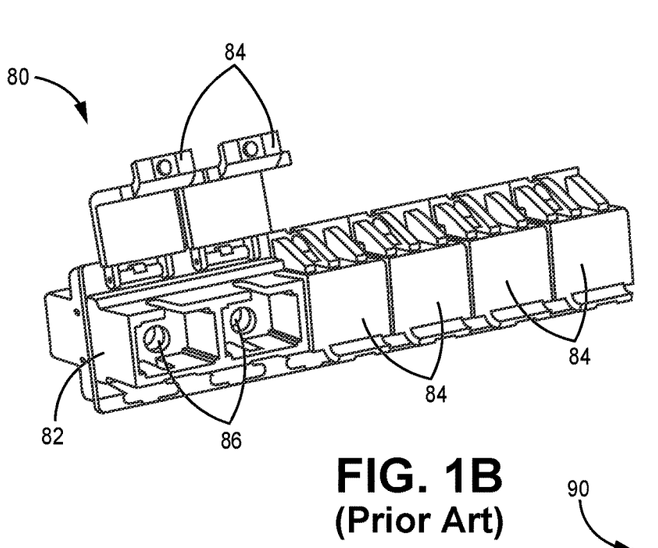
FIG. 1B illustrates another example of a module with a shutter of the prior art.
Figure 1C:
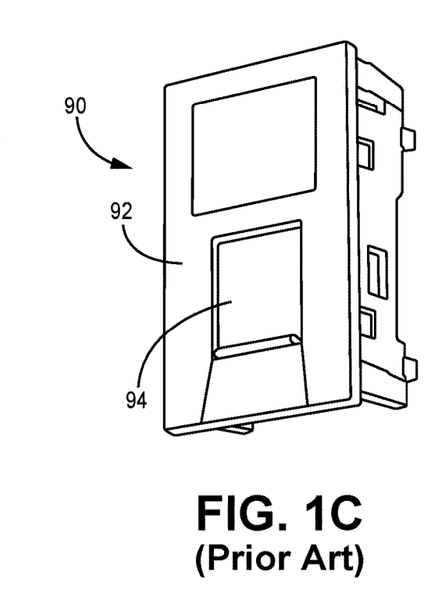
FIG. 1C illustrates yet another example of a module with a shutter of the prior art.

For further background, examples of modules that includes shutters with associated ports of the prior art are illustrated in FIGS. 1A through 1C. In particular, FIG. 1A illustrates a first type of module 70 that includes a body 72 with a port 76. Module 70 further includes a shutter 74 (cover) that is designed to cover the port 76 when the port 76 is not being used. FIG. 1A illustrates the shutter 74 being in an open position for illustration purposes. Shutters are fairly common mechanism used to prevent debris, such as dust, from entering into the port when not in use. Another example of module 80 is illustrated in FIG. 1B. In this example, the body 82 includes a plurality of ports 86 and shutters 84. In FIG. 1B some of the shutters 84 are in an open position and some of the shutters 84 are in a closed position. Further FIG. 1C illustrates another a wall plate module 90 that includes a shutter 94 that slides up or down in changing between a closed and open position. In FIG. 1C, the shutter 94 is in the closed position covering access to a port in the body 92 of the wall plate module. As illustrated in these examples, the shutters have a closed position and an open position while operation of shutters come in different configurations. Embodiments use the physical position of the shutter to automatically communicate information to a management system at a remote location.

Figure 2:
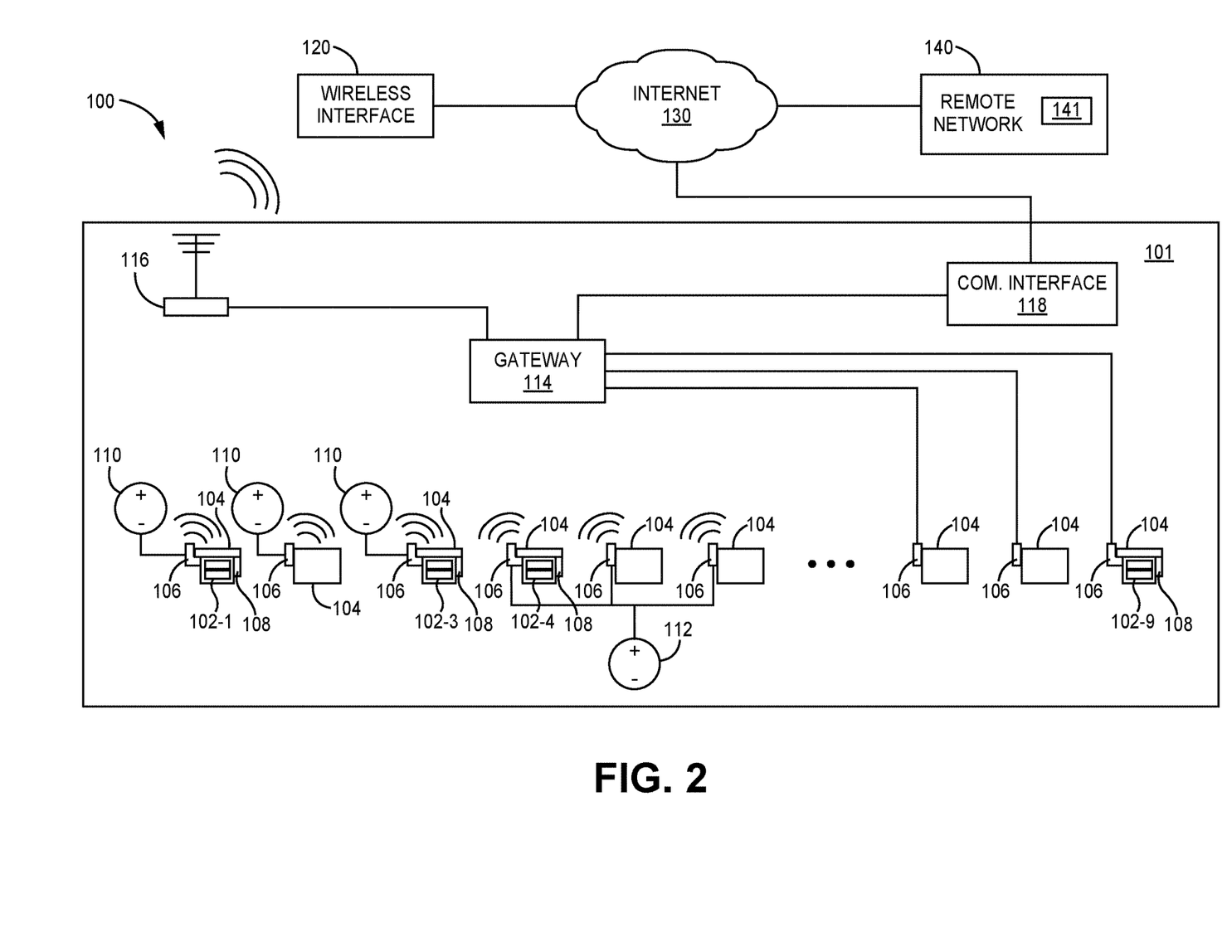
FIG. 2 illustrates a block diagram of an IoE system for a cabling infrastructure according to one exemplary embodiment.

FIG. 2 illustrates an IoT system 100 of an example embodiment. The system 100 in this example include a panel 101, such as a patch panel 101, used for cabling infrastructure. The patch panel 101 includes a plurality of ports which can be generally referenced as 102 and a plurality of associated shutters 104. In the example, the shutters 104 for ports 102-1, 102-3, 102-4 and 102-9 are illustrated as being open while the remaining shutters 104 are illustrated as being closed covering their associated port 102. Although the ports 102 and associated shutters 104 are described as being contained in a patch panel 101, the ports 102 and shutters 104 may be contained in any type of communication connection assembly such as, but not limited to, an adaptor pack in a panel and modules including a module jack in a wall outlet or a break out module. Further the ports 102 and associated shutters 104 may be part of a discrete communication connection assembly or part of a group of communication connection assemblies.

Each port 102 is connected to a fixed communication line. Each port 102 is also configured to be selectively coupled to a patch cord connector of a patch cord (not shown). That is, each port 102 is configured to be selectively physically connected to a patch cord connector that is part of a patch cord. Each port 102 includes a suitable female connector, adapter, or jack that mates with the corresponding male connector on the end of the patch cord. The connection between the patch cord connector and the port connector is designed to facilitate the easy and repeated attachment and un-attachment of the patch cord to the port 102. Each port 102 communicatively couples the respective fixed communication line to the respective patch cord connector of any patch cord inserted into that port 102.

Embodiments use shutter states of the shutters 104 as a basis to automatically configure the system at a management system 141 of a remote network 140 without requiring the technician to manually report changes made at the patch panel 101. In embodiments, a sensor 106 is used for each shutter 104. Different types of sensors 106 such as, but not limited to, shutter position change sensors that senses changes in shutter position, open/closed circuit sensors and object proximity sensors that may include inductive, capacitive and magnetic sensing sensors may be used. In an embodiment, each shutter 104 and associated sensor 106 is replaceable.

Each sensor 106 is designed to send a shutter state signal to a gateway 114. The shutter state signal may be sent when a change of shutter state has been detected by an associated sensor (i.e. the shutter has moved from a closed (cover) position to an open position or from an open position to a closed position). In further embodiments the shutter state signal may be a sent a periodic times to indicate the current state of the shutter (i.e. open or closed). The shutter state signal may be used, for example, in an embodiment where the gateway 114 polls the sensors 106 at select times, and the sensors 106 in response, provide the current shutter state of its associated shutter 104. The gateway 114 is in communication with the sensors 106 and, in an example embodiment, is an aggregator of all shutter state signal data. The gateway 114 provides an interface to the data for other systems, such as the remote network 140 where a management system 141 may reside.

Bias members 108 may be operationally coupled to associate shutters 104 to provide a bias force on the shutter 104 to force the shutter 104 in a closed position when not in use. In this embodiment, an external connector (not shown) that is placed in an associated port 102 counters the bias force and keeps the associated shutter 104 open. When an external connector is not in the associated port 102, the shutter 104 is forced into the closed position by the associated bias member 108. This configuration prevents the sensing of a false open shutter position signals when an external connector is not positioned within the associate port 102. Examples, of a bias member 108 include mechanical devices such as, but not limited to, one or more springs and/or electrical devices such as, but not limited to, an electrical actuator.

In some embodiments, the sensors 106 have their own power source so they are powered independently of a power source of the panel 101. Examples of independent power sources are power sources 110 and 112 of FIG. 2. Each power source 110, in this example, is associated with its own sensor 106. In another embodiment the power source, such as power source 112 is shared among a plurality of sensors 106. An example of a power source is a battery. Since the sensors 106 are only communicating during a state of change and the power requirement is low, the expected life of current batteries may be around 15 years. In another embodiment the sensors 106 may be powered by a power source associated with the panel 101. Other methods of powering the sensor may be used, such as but not limited to, a piezoelectric system that generates a voltage when an associated shutter 104 is opened. Hence, other types of systems using different types of power source maybe used to power the sensors 106.

In some embodiments, the sensors communicate with the gateway via wireless communication systems. Some embodiment's use no power or low power wireless commutation systems and protocols such a Zigbee, Thread and Bluetooth Mesh to communicate with the gateway 114. Further in another embodiment, the sensor 106 may uses a radio frequency identification (RFID) system for communication, such as a passive RFID with an inverted input with a single input/output pin that when energized by a reader outputs the state of the shutter. In other embodiments the sensors may use WiFi or have a wired connection to the gateway 114.

Figure 3:
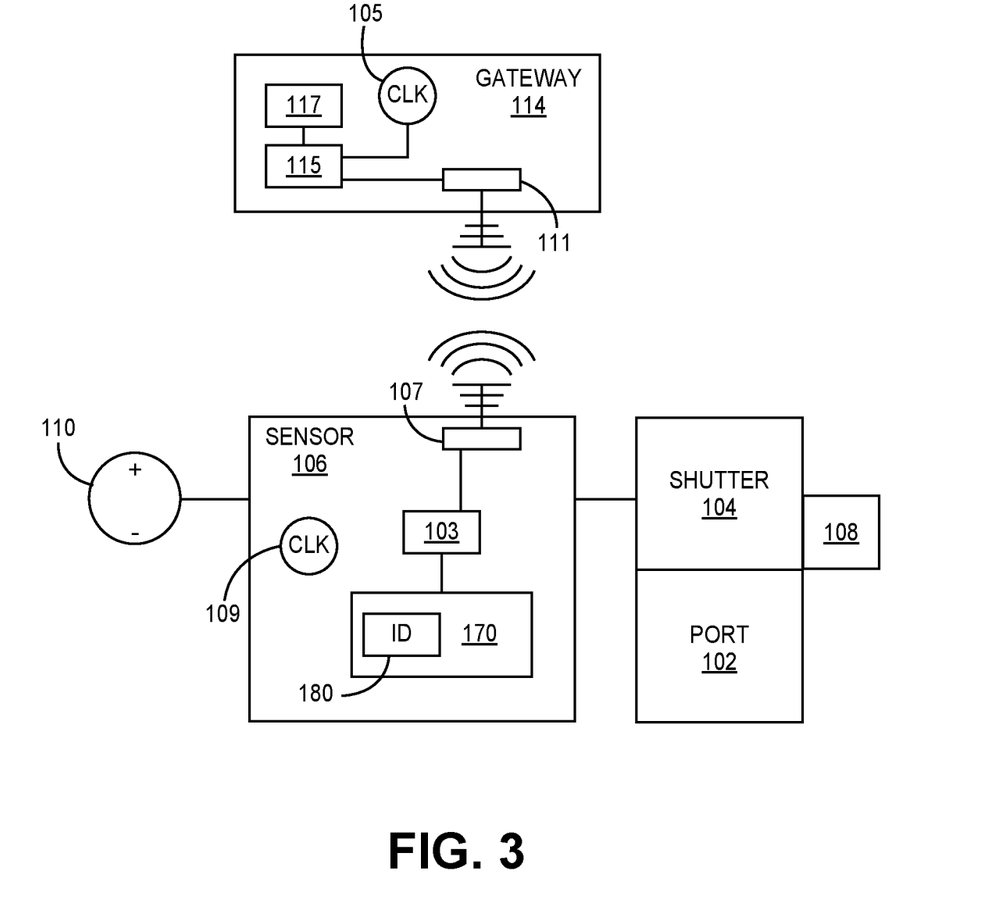
FIG. 3 illustrated a block diagram of one shutter/port/sensor and the gateway of FIG. 2.

A close up block view of a sensor 106, port 102, shutter 104 and gateway 114 in an example embodiment is illustrated in FIG. 3. The sensor 106 in this example is illustrated as including a memory 170 that is used in part to store and identification (ID) 180 of its associated port 102. In an embodiment, the ID 180 is included in a shutter state signal that is communicated to the gateway 114. Other information may be included in the sensor data including alarms. Further, the unique IDs may include information about port type, manufacturing date, product ID, etc. In one embodiment, the shutter state may be communicated by modifying the unique ID. For example, this may be accomplished by inverting the ID or encoding a shutter state ID in a bit of the unique ID. The shutter sensors that are mounted on the same panel/module may have a common ID or portion of a common ID base, with a port/shutter index as a differentiator. Further the sensors 106 may be programmed in the field, in an embodiment, by adding location, test data, installation date, etc.

Some embodiments of the sensor 106 may include a clock 109 and a sensor controller 103. In these embodiments, using the clock 109, the controller 103 periodically sends a status of the shutter 104 to the gateway 114. Although the clock 109 is shown within the sensor 106 in the embodiment of FIG. 3, the clock 109 maybe external in other embodiments. An external clock may be part of a different system that provides an external clock signal to the sensor 106. In another embodiment, the gateway 114 polls the sensors 106 periodically (using its own clock 105) to cause the sensor to send the then current status of the shutter to the gateway 114. Further in some embodiments, only when a change of shutter state is detected is a state of change signal sent to the gateway 114. Further in other embodiments, both a periodic and sensed change of state signal generation is used.

The example gateway 114 in FIG. 3 is illustrated as including a transceiver 111 to receive signals sent from a transceiver 107 of the sensor 106. The gateway 114 may also include a controller 115, a clock 105 and a memory 117. The memory 117 may include operating instructions that when implemented by the controller 115 performs functions of the gateway 114. Further as discussed above, the gateway 114 may aggregated sensor information including sensed states of shutters in the memory 117.

In general, the controller 103 of the sensor 106 and controller 115 of the gateway 114 may include any one or more of a processor, microprocessor, a digital signal processor (DSP), an application specific integrated circuit (ASIC), a field program gate array (FPGA), or equivalent discrete or integrated logic circuitry. In some example embodiments, the controllers 103 and 115 may include multiple components, such as any combination of one or more microprocessors, one or more controllers, one or more DSPs, one or more ASICs, one or more FPGAs, as well as other discrete or integrated logic circuitry. The functions attributed to the controllers 103 and 115 herein may be embodied as software, firmware, hardware or any combination thereof. Any such software or firmware can comprise program instructions that are stored (or otherwise embodied) on or in an appropriate non-transitory storage medium or media, such as memory 170 of the sensor and memory 117 of the gateway from which at least a portion of the program instructions are read by the associated processor or other programmable device for execution thereby. The memories 170 and 117 may further be used for storing sensor information as discussed above.

The gateway 114 is configured to communicate sensor information from the sensors to a remote location, such as a remote network 140 illustrated in FIG. 2 using the IoT. The gateway 114 has its own IP address. The remote network 140 for example, may be a service provider such as a cellular network service provider. The gateway 114 may use a wireless transceiver 116 such as WiFi, to communicate with a wireless interface 120, such as wireless router, that is in communication with the internet 130. The remote network 140 then receives the information from the internet. In another embodiment, the gateway 114 is hardwired to communicate the sensor information to a communication interface 118 of the panel 101. The communication interface 118 in this example communicates with the remote network via the internet 130.

Although the gateway 114 is illustrated as being located within the panel 101 in FIG. 2, in other embodiments it may be located in another location. For example, in a wireless communication arrangement between the sensors 106 and gateway 114, the gateway may be located in a different location than the panel 101 as long as it is not placed outside the communication range of the wireless communication system used to communicate sensor information signals to the gateway 114.

Figure 4:
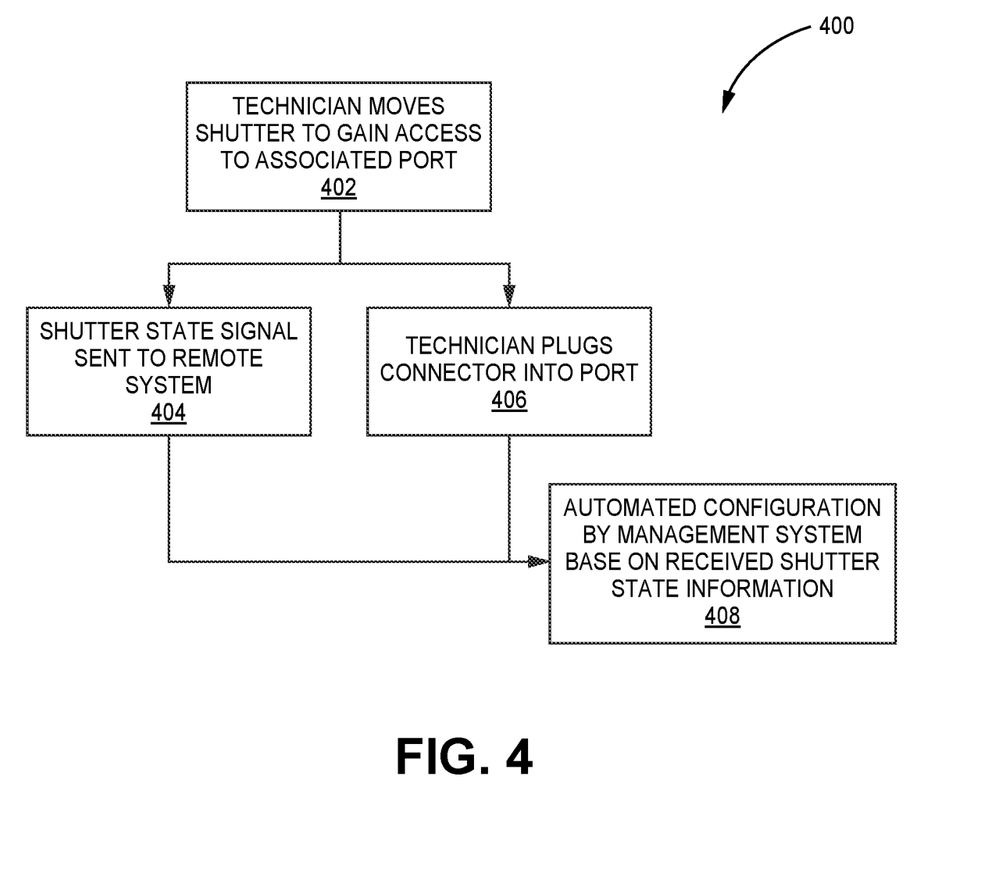
FIG. 4 illustrates an operation flow diagram according to one exemplary embodiment.

Referring to FIG. 4, an operation flow diagram 400 of an example embodiment is illustrated. The method set out in the operation flow diagram 500 is described as being implemented in the system shown in FIGS. 2 and 3. The method may be implemented in other ways in other embodiments. The blocks of the flow diagram 400 have been arranged in a generally sequential manner for ease of explanation. It is to be understood that this arrangement is merely exemplary, and should be recognized that the processing associated with the methods (and the blocks shown in the figures) can occur in a different order (for example, where at least some of the processing associated with the blocks is performed in parallel and/or in an event-driven manner).

In a patch panel example, when a technician is provided a work order to employ services to a specific location, the technician locates the correct port in a patch panel to insert a patch cord connector. To access the port, the technician moves the associated shutter from a closed position to an open position as indicated at block (402). A shutter state signal is sent to a remote system, such as the management system 141 in the remote network 140, at block (404) and the technician plugs the patch cord connector into a port 102 of the patch panel 101 at block (406). An automatic configuration of the system at the remote network occurs at block (406), based on the shutter state information communicated to the management system 141 at the remote network 140 at block (408). As discussed above, the shutter state information includes at current states of shutters and associated port ID information.

Other information, if available, may also be included in the shutter state signal. Such information may be added to the sensor memory at the time of the installation. For example, performance parameter information as the result of field tests may be included as well as other information. For example, continuity, compliance with transmission standards, proper wire mapping, and length of cable information may be included. Further, if the patch cord connector is configured to pass configuration information (such as ID information and connection information) to the port upon the connection thereto, that information may be passed on to the management system at the remote location through the shutter state signal.

Figure 5A:
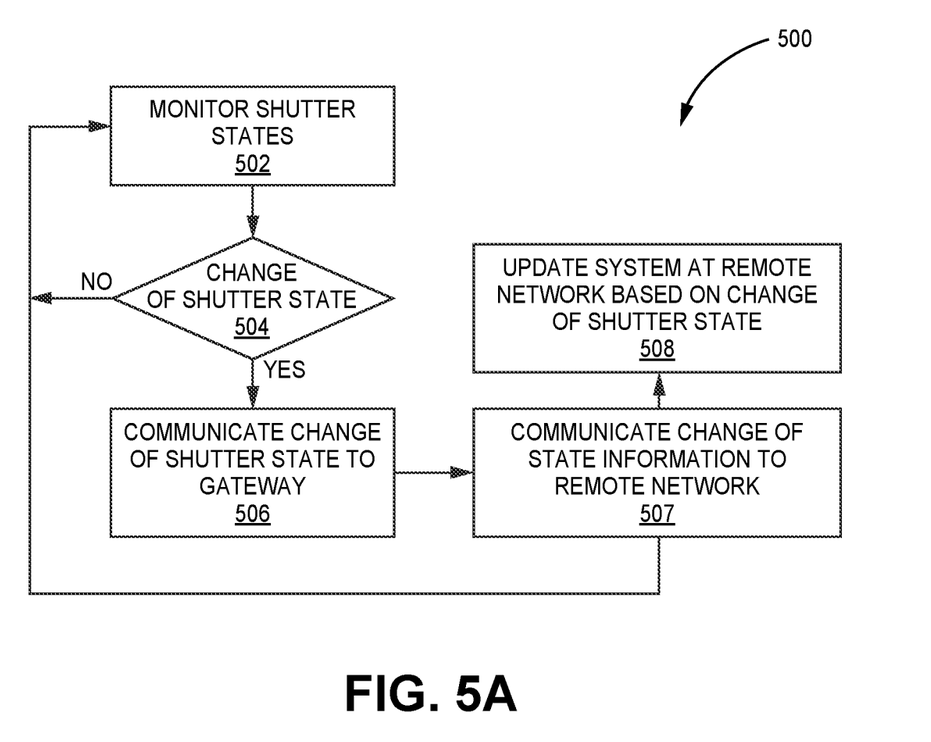
FIG. 5A illustrates an automatic configuration update flow diagram according to one exemplary embodiment.

Referring to FIG. 5A, one example of an automatic configuration update flow diagram 500 of an embodiment is illustrated. In this example, the shutter state signal is sent at the detection of a change in state. The method set out in the automatic configuration update flow diagram 500 is described as being implemented in the system shown in FIGS. 2 and 3. The method may be implemented in other ways in other embodiments. The blocks of the flow diagram 500 have been arranged in a generally sequential manner for ease of explanation. It is to be understood that this arrangement is merely exemplary, and should be recognized that the processing associated with the methods (and the blocks shown in the figures) can occur in a different order (for example, where at least some of the processing associated with the blocks is performed in parallel and/or in an event-driven manner).

At block (502) the shutter states are monitored. As discussed above, a shutter 104 has two states, an open state (open position) allowing access to an associated port 102 or a closed state (closed position) that covers the port 102. The monitoring of shutter states is done with respective sensors 106. The sensors 106 in this example are configured to generate a shutter state signal upon detection of a change in shutter state. As discussed above, the sensors 106 may include sensors that monitor changes in shutter position (up/down), open/closed circuits, object proximity and inductive and capacitive sensing sensors. When no change of shutter state is monitored at block (504), the process continues at block (502) monitoring shutter positions. If it is determined at block (504) a change of shutter state of at least one shutter has taken place, the change of shutter state of the associated shutter is communicated to the gateway at block (506) with a shutter state signal. The gateway 114 then communicates change of state information to the remote network at block (507). A management system 141 at the remote network 140 updates and configures the use of the ports automatically at block (508) based on the communication from the gateway 114.

Figure 5B:
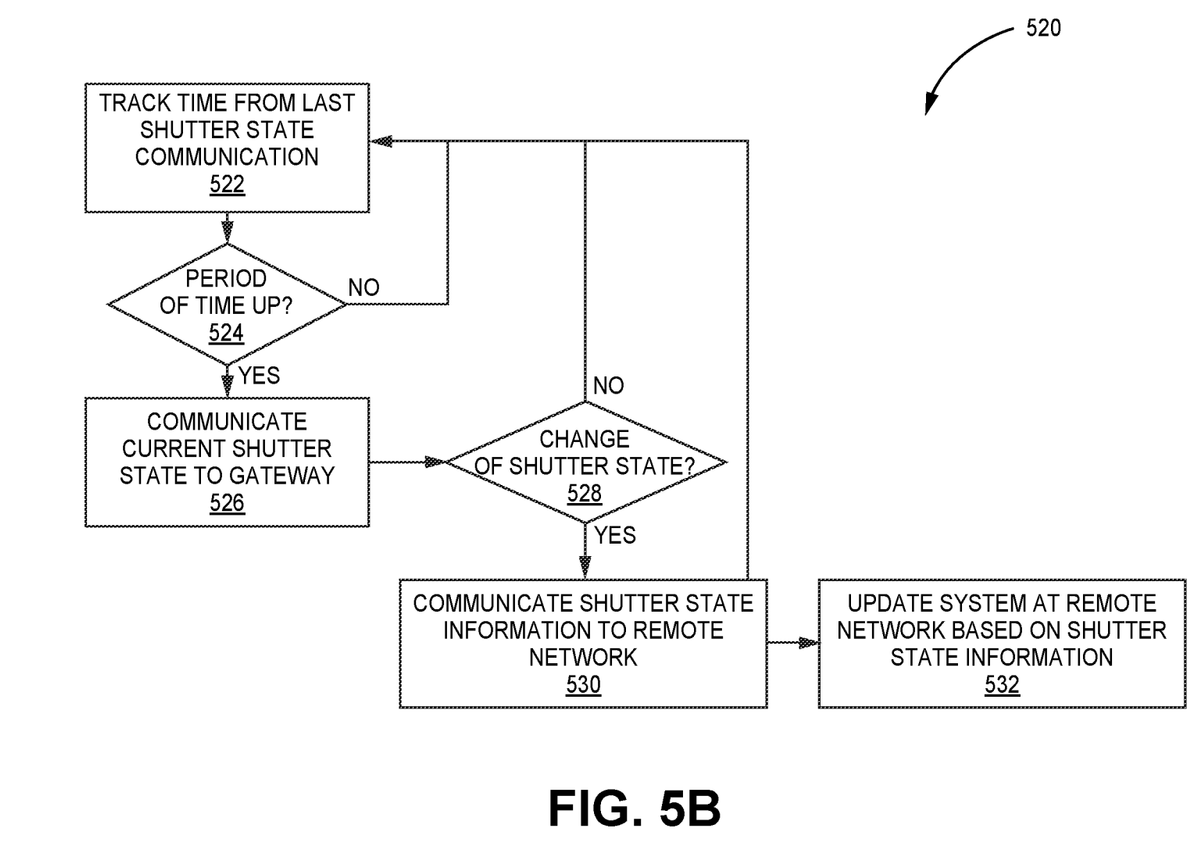
FIG. 5B illustrates an automatic configuration update flow diagram according to another exemplary embodiment.

Another example of an automatic configuration update flow diagram 520 is illustrated in FIG. 5B. In this example, a shutter state signal is periodically sent to the gateway 114. The method set out in the automatic configuration update flow diagram 520 is described as being implemented in the system shown in FIGS. 2 and 3. The method may be implemented in other ways in other embodiments. The blocks of the flow diagram 520 have been arranged in a generally sequential manner for ease of explanation. It is to be understood that this arrangement is merely exemplary, and should be recognized that the processing associated with the methods (and the blocks shown in the figures) can occur in a different order (for example, where at least some of the processing associated with the blocks is performed in parallel and/or in an event-driven manner).

This example tracks the time from the last communication of a shutter state at block (522). The time may be tracked in different manners and locations. For example, the time may be tracked by the sensors 106 themselves with one or more clocks or with timing signals. Further in an embodiment the gateway 114 may track the time and poll the sensors 106 when the preselected time period has expired. Once a preselected time has expired at block (524), the current state of associated shutters 104 are communicated to the gateway 114 at block (526) via shutter state signal. In an embodiment, once the current status of an associated shutter 104 is received at the gateway 114, the controller 115 of the gateway 114 determines if a change of shutter state has occurred at block (528). One method of doing this is by comparing an associated prior stored shutter state in a memory 117 of the gateway 114 with the current shutter state. In another embodiment, this can be done at the remote network 140 or another location and the gateway 114 is used to simply forward on the current shutter state signal.

In the automatic configuration update flow diagram 520 example of FIG. 5B, if the gateway determines there is no change of shutter state at block (528), the process continues tracking the time from the last shutter state communication at block (522). If the gateway 114 determines there is change of shutter state at block (528), the shutter state information is communicated to remote network 140 at block (530). The system tracking the use of the associated port is then automatically updated and configured at the remote network 140 at block (532).

Further embodiments may combine the methods set out in FIGS. 5A and 5B so that a shutter state signal is generated and sent to the gateway 114 at the detection of a change in state and at periodic intervals.

Example Embodiments

Example 1 includes a system for cabling infrastructure. The system includes at least one port, at least one shutter, at least one sensor and a gateway. The at least one port is configured to be selectively coupled to a connector. The at least one shutter is configured to have an open state that allows access to an associated port of the at least one port and a closed state that covers the associated port. Each sensor is configured to sense the open state and the closed state of an associated shutter of the at least one shutter and generate shutter state signals that include information relating to at least a current sensed state of the associated shutter and an identification (ID) of a port that is associated with the associated shutter. The gateway is in wireless communication with each sensor to receive the shutter state signals. The gateway is configured to communicate the shutter state signals that indicate a change in a state of an associated shutter to a remote location.

Example 2, includes the system of Example 1, further including an independent power source for at least one sensor of the at least one sensor.

Example 3 includes the system of any of the Examples 1-2, wherein the sensor further includes a sensor memory to store sensed states of each shutter and the associated ID of the associated port.

Example 4 includes the system of any of the Examples 1-3, wherein the gateway and each sensor communicate wirelessly via one of Zigbee, Thread, Bluetooth mesh and passive radio frequency identification protocols.

Example 5 includes the system of any of the Examples 1-4, wherein the gateway further includes a gateway controller, a clock and gateway memory. The gateway controller is configured to use an internet protocol (IP) address of the gateway in communicating with the remote location via an internet. The gateway controller is further configured to use the clock to poll each sensor periodically to send a current shutter state signal. The gateway memory is used to store information in received shutter state signals. The gateway controller is further configured to determine if information in received shutter state signals are different than stored information associated with each shutter and forward on information that is different to the remote location via the internet.

Example 6 includes the system of any of the Examples 1-5, wherein each sensor is one of a shutter position change sensor that senses position changes of an associated shutter, an open/closed circuit sensor, an object proximity sensor, an inductive sensing sensor, a capacitive sensing sensor and a magnetic sensing sensor.

Example 7 includes the system of any of the Examples 1-6, further including a management system in a remote network in the remote location configured to update and configure a system automatically based on received information sent by the gateway.

Example 8 includes the system of any of the Examples 1-7, further including a bias member for each shutter that is configured to bias the shutter in the closed state when the shutters associated port is not in use.

Example 9 includes the system of any of the Examples 1-8, wherein each sensor further includes a sensor controller configured to generate the shutter state signals.

Example 10 includes the system of Example 9, wherein the sensor controller is configured to incorporate the ID of the associated port in the shutter state signals.

Example 11 includes the system of Example 10 wherein incorporating the ID of the associated port in the shutter state signals includes at least one of inverting the ID of the associated port and encoding a shutter state ID in a bit of the ID of the associated port.

Example 12 includes the system of Example 9, wherein the sensor controller is configured to further include further information in the shutter state signals relating to at least one of alarms, associated port type, manufacturing date, product ID, performance parameters and mapping.

Example 13 includes another system for cabling infrastructure. The system includes at least one port, a shutter for each port, a sensor of each shutter, a power source for each sensor, a gateway and a management system. The at least one port is configured to be selectively coupled to a connector of a patch panel. Each shutter is configured to have an open state which allows access to an associated port of the shutter and a closed state that covers the associated port. The sensor for each shutter is configured to sense the state of the shutter. The sensor is configured to wirelessly transmit shutter state signals that include information relating to at least a current sensed state of the shutter and an identification (ID) of the shutters associated port. The power source for each sensor is used to at least power the transmission of the shutter state signals. The gateway is in wireless communication with each sensor to receive the shutter state signals from each sensor. The gateway is configured to communicate information indicating a change in state of an associated shutter to a remote location. The management system is in a remote network in the remote location and is configured to update and configure a system automatically based on received information sent by the gateway.

Example 14 includes the system of Example 13, wherein the gateway further includes a gateway controller, a clock and a gateway memory. The gateway controller is configured to use the clock to poll each sensor periodically to send a current shutter state signal. The gateway memory is used to store information in received shutter state signals. The gateway controller is further configured to determine if information in received shutter state signals are different than stored information associated with each shutter and forward on information that is different to the remote location.

Example 15 includes the system of any of the Examples 13-14, wherein the sensor is configured to transmit a shutter state signal upon the detection of a change of state of the shutter.

Example 16 includes the system of any of the Examples 13-15, wherein the sensor is one of a shutter position change sensor that senses changes in an associated shutter position, an open/closed circuit sensor, an object proximity sensor, an inductive sensing sensor, a capacitive sensing sensor and a magnetic sensing sensor.

Example 17 includes the system of any of the examples 13-16, wherein communication between the gateway and the remote location is at least in part via an internet using an internet protocol (IP) address of the gateway.

Example 18 includes a method of configuring a cabling infrastructure. The method includes monitoring the current state of a shutter with a sensor, wherein the state of the shutter is one of an open state which allows access to an associated port and a closed state that covers the associated port; wirelessly communicating a shutter state signal to a gateway, the shutter state signal including information relating to at least a current sensed state of the shutter by the sensor and an identification (ID) of the associated port; communicating information in shutter state signals that indicate a change of a state of the shutter to a system in a remote location; and automatically configuring the system based on the communicated information from the gateway.

Example 19 includes the method of Example 18, further including periodically polling the sensor to communicate shutter state signals; and determining if the state of the shutter has change from a prior stored associated state of the shutter.

Example 20 includes the method of any of the Examples 18-19, further including communicating the shutter state signal to the gateway upon detection of a change in the state of the shutter.

Example 21 includes the method of any of the Examples 18-20, further including incorporating the state of the shutter in the ID of the associated port by at least one of, inverting the ID and encoding the shutter state ID in a bit of the ID.

Example 22 includes the method of any of the Examples 18-21, wherein communicating information in shutter state signals that indicate a change of shutter state to a system in remote location further includes using an internet protocol (IP) address of the gateway to at least in part communicate the information in shutter state signals to the system in the remote location via an internet.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A system for cabling infrastructure, the system comprising:
   at least one port configured to be selectively coupled to a connector;
   at least one shutter, the at least one shutter configured to have an open state that allows access to an associated port of the at least one port and a closed state that covers the associated port;
   at least one sensor, each sensor configured to sense the open state and the closed state of an associated shutter of the at least one shutter and generate shutter state signals that include information relating to at least a current sensed state of the associated shutter and an identification (ID) of a port that is associated with the associated shutter, each sensor configured to be programmed to include at least one of location information, test data information and installation date information, the generated shutter state signals of the associated shutter including at least one of the at least one location information, the test data information and the installation date information; and
   a gateway configured to wirelessly receive the shutter state signals of each sensor, the gateway configured to communicate shutter state signals of the received shutter state signals that indicate a change in a state of an associated shutter to a remote location.

2. The system of claim 1, further comprising:
   an independent power source for at least one sensor of the at least one sensor.

3. The system of claim 1, wherein each sensor of the at least one sensor further comprises:
   a sensor memory to store sensed states of the associated shutter and the associated ID of the associated port.

4. The system of claim 1, wherein the gateway and each sensor communicate wirelessly via one of Zigbee, Thread, Bluetooth mesh and passive radio frequency identification protocols.

5. The system of claim 1, wherein the gateway further comprises:
   a gateway controller configured to use an internet protocol (IP) address of the gateway in communicating with the remote location via an internet;
   a clock, the gateway controller configured to use the clock to poll each sensor periodically to send a current shutter state signal; and
   a gateway memory to store information in received shutter state signals, the gateway controller further configured to determine if information in received shutter state signals are different than stored information associated with each shutter and forward on information that is different to the remote location via the internet.

6. The system of claim 1, wherein each sensor is one of a shutter position change sensor that senses changes in a position of an associated shutter, an open/closed circuit sensor, an object proximity sensor, an inductive sensing sensor, a capacitive sensing sensor and a magnetic sensing sensor.

7. The system of claim 1, further comprising:
   a management system in a remote network in the remote location configured to update and configure new connections automatically based on received information sent by the gateway.

8. The system of claim 1, further comprising:
   a bias member for each shutter configured to bias the shutter in the closed state when the shutter's associated port is not in use.

9. The system of claim 1, further comprising:
   an independent power source for at least one sensor of the at least one sensor that includes a system that generates a voltage when an associated shutter is at least opened.

10. The system of claim 1, further comprising:
    modifying the ID of the port to communicate the current sensed state of the associated shutter includes using a first bit state in the ID of the port to indicate the associated shutter is open and a second bit state in the ID of the port to indicate the associated shutter is closed.

11. The system of claim 1, wherein each sensor is configured to be field programmed.

12. The system of claim 1, wherein each sensor further comprises:
    a sensor controller configured to generate the sensor's shutter state signals.

13. The system of claim 12, wherein the sensor controller is configured to further include further information in the sensor's shutter state signals relating to at least one of alarms, associated port type, manufacturing date, product ID, performance parameters and mapping.

14. A method of configuring a cabling infrastructure, the method comprising:
- programing a sensor to include at least one of location information, test data information and installation date information;
- monitoring a current state of a shutter with the sensor, wherein the state of the shutter is one of an open state which allows access to an associated port and a closed state that covers the associated port;
- wirelessly communicating a shutter state signal to a gateway, the shutter state signal including information relating to at least a current sensed state of the shutter by the sensor, an identification (ID) of the associated port and at least one of the location information, the test data information, and the installation date information, wherein the current sensed state of the associated shutter is communicated by modifying the ID of the associated port;
- communicating information in shutter state signals that indicate a change of state of the shutter to a system in a remote location; and
- automatically configuring the system based on the communicated information from the gateway.

15. The method of claim 14, further comprising:
- periodically polling the sensor to communicate shutter state signals; and
- determining if the current sensed state of the shutter has change from a prior stored associated state of the shutter.

16. The method of claim 14, wherein the communicating the shutter state signal to the gateway occurs upon detection of a change in the current state of the shutter.

17. The method of claim 14, wherein modifying the ID of the associated port to communicate the current sensed state of the associated shutter further comprises using a first bit state in the ID of the port to indicate the associated shutter is open and a second bit state in the ID of the port to indicate the associated shutter is closed.

18. The method of claim 14, wherein communicating information in shutter state signals that indicate a change of shutter state to a system in remote location further comprises:
- using an internet protocol (IP) address of the gateway to at least in part communicate the information in shutter state signals to the system in the remote location via an internet.

19. The method of claim 14, wherein the sensor is field programmed to include at least one of the location information, the test data information and the installation date information.

20. A system for cabling infrastructure, the system comprising:
- at least one port configured to be selectively coupled to a connector;
- at least one shutter, the at least one shutter configured to have an open state that allows access to an associated port of the at least one port and a closed state that covers the associated port;
- at least one sensor, each sensor configured to sense the open state and the closed state of an associated shutter of the at least one shutter; and
- a controller configured to generate port state data for each port including a state of a shutter associated with each port, wherein the state of the shutter associated with each port is determined using a sensor associated with the shutter, wherein the controller is configured to communicate the port state data for each port along with other information to a remote network, further wherein the port state data from each sensor communicated to the remote network includes an identification (ID) of an associated port and at least one of location information, test data information, and installation date information.

21. The system of claim 20, further comprising:
- a gateway in communication with each sensor that tracks in real-time use of the at least one port, the controller included in the gateway.

22. The system of claim 20 further wherein each sensor comprises at least one of a magnetic field sensing sensor, a position change sensor, an open/close sensor, an inductive sensor, and a capacitive sensor.

23. A system for cabling infrastructure, the system comprising:
- a plurality of ports, each port configured to be selectively coupled to a connector;
- at least one sensor, each sensor configured to sense port state information associated with a port;
- a gateway in communication with each sensor that tracks in real-time use of the plurality of ports, the gateway configured to automatically gather and compile port state data from each sensor for local use and communicate the port state data from each sensor to the a remote network; and
- wherein the port state data from each sensor communicated to the remote network includes an identification (ID) of an associated port and at least one of location information, test data information, and installation date information.

24. The system of claim 23, wherein the at least one sensor is a shutter state sensor.

25. The system of claim 23, wherein a current sensed state of the associated port is communicated by modifying the ID of the associated port.

26. The system of claim 23, wherein the gateway further comprises:
- a gateway controller configured to use an internet protocol (IP) address of the gateway in communicating with the remote network through an internet;
- a clock, the gateway controller configured to use the clock to poll each sensor periodically to send a current port state information to the remote network; and
- a gateway memory to store the port state data from each sensor, the gateway controller further configured to determine if received port state data is different than stored port state data associated with each port and forward on port state data that is different to the remote network via the internet.

* * * * *